United States Patent
McKnew et al.

(10) Patent No.: US 12,222,720 B2
(45) Date of Patent: Feb. 11, 2025

(54) DYNAMIC TIRE ROTATION DURING COLLISION

(71) Applicant: GM Cruise Holdings LLC, San Francisco, CA (US)

(72) Inventors: Jennifer Devar McKnew, San Francisco, CA (US); Ryan Holben, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 264 days.

(21) Appl. No.: 16/861,877

(22) Filed: Apr. 29, 2020

(65) Prior Publication Data
US 2021/0341926 A1 Nov. 4, 2021

(51) Int. Cl.
| | | |
|---|---|---|
| *G05D 1/00* | (2024.01) | |
| *B60W 60/00* | (2020.01) | |
| *G05B 13/02* | (2006.01) | |
| *G05B 13/04* | (2006.01) | |

(52) U.S. Cl.
CPC ....... *G05D 1/0214* (2013.01); *B60W 60/0015* (2020.02); *G05B 13/0265* (2013.01); *G05B 13/048* (2013.01); *B60W 2552/05* (2020.02); *B60W 2554/806* (2020.02); *B60W 2720/24* (2013.01)

(58) Field of Classification Search
CPC ............ G05D 1/0214; B60W 60/0015; B60W 2552/05; G05B 13/0265; G05B 13/048
See application file for complete search history.

(56) References Cited

U.S. PATENT DOCUMENTS

| | | | |
|---|---|---|---|
| 10,146,223 B1* | 12/2018 | Luders | G05D 1/0088 |
| 2010/0134320 A1* | 6/2010 | Chevion | G08G 1/164 |
| | | | 340/932 |
| 2015/0248131 A1* | 9/2015 | Fairfield | G05D 1/0011 |
| | | | 701/2 |
| 2016/0280266 A1* | 9/2016 | Kawamata | B60W 10/184 |
| 2017/0072949 A1* | 3/2017 | Vollmer | B60W 10/20 |
| 2019/0243371 A1* | 8/2019 | Nister | G05D 1/0242 |
| 2020/0079366 A1* | 3/2020 | Higashitani | B60W 40/08 |
| 2020/0191970 A1* | 6/2020 | Hou | G01S 17/931 |
| 2020/0249682 A1* | 8/2020 | Kojo | G05D 1/0214 |
| 2021/0016830 A1* | 1/2021 | Riese | B62D 6/008 |
| 2021/0053569 A1* | 2/2021 | Censi | B60W 30/18163 |

* cited by examiner

*Primary Examiner* — Jelani A Smith
*Assistant Examiner* — Toya Pettiegrew
(74) *Attorney, Agent, or Firm* — Dimitri Kirimis

(57) ABSTRACT

The subject disclosure relates to features that improve safety for autonomous vehicle (AV) driving maneuvers. In some aspects, a process of the disclosed technology includes steps for detecting an unprotected maneuver, navigating an AV into an intersection, and detecting a wheel safety angle relative to the intersection. In some aspects, the process further includes steps for automatically adjusting a wheel angle of the AV based on the wheel safety angle. Systems and machine-readable media are also provided.

17 Claims, 5 Drawing Sheets

DYNAMIC TIRE ROTATION DURING COLLISION

BACKGROUND

1. Technical Field

The subject technology provides solutions for improving autonomous vehicle (AV) safety and in particular, for improving AV safety for unprotected driving maneuvers, such as unprotected left-turns.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Unprotected driving maneuvers, such as unprotected left-turns, are typically performed when there are no traffic signals to indicate that a maneuver can be safely executed. In a classic example, unprotected left-turns occur in intersections lacking traffic lights to indicate that oncoming traffic is halted. Due to the lack of explicit signal indicators, unprotected driving maneuvers are generally more dangerous than protected driving maneuvers. In the case of unprotected left-turns performed in traffic intersections, safety guidelines, and some vehicle code regulations, instruct that vehicle wheels are to be kept straight (i.e., no turn angle), so that in the case of a rear-end collision the vehicle is not pushed into oncoming traffic.

While straight angle wheel directions often represent the safest wheel angle before executing an unprotected left-turn, some degree of wheel angle can be advantageous for autonomous vehicle (AV) operation where sudden and/or quick changes to wheel angle are best avoided. Aspects of the disclosed technology address the foregoing challenges in executing unprotected AV driving maneuvers by providing solutions for determining an optimal wheel angle (i.e., a "wheel safety angle") that balances concurrent concerns for safety and maneuver performance. As discussed in further detail below, the wheel safety angle can be calculated based on a variety of environmental factors, including but not limited to: intersection topologies and/or traffic patterns. In some aspects, where impending collisions are detected, other safety precautions may be automatically taken, such as re-adjusting the wheel angle and/or locking the wheels (e.g., using an emergency braking system), to prevent additional collision damage.

Figure 1:
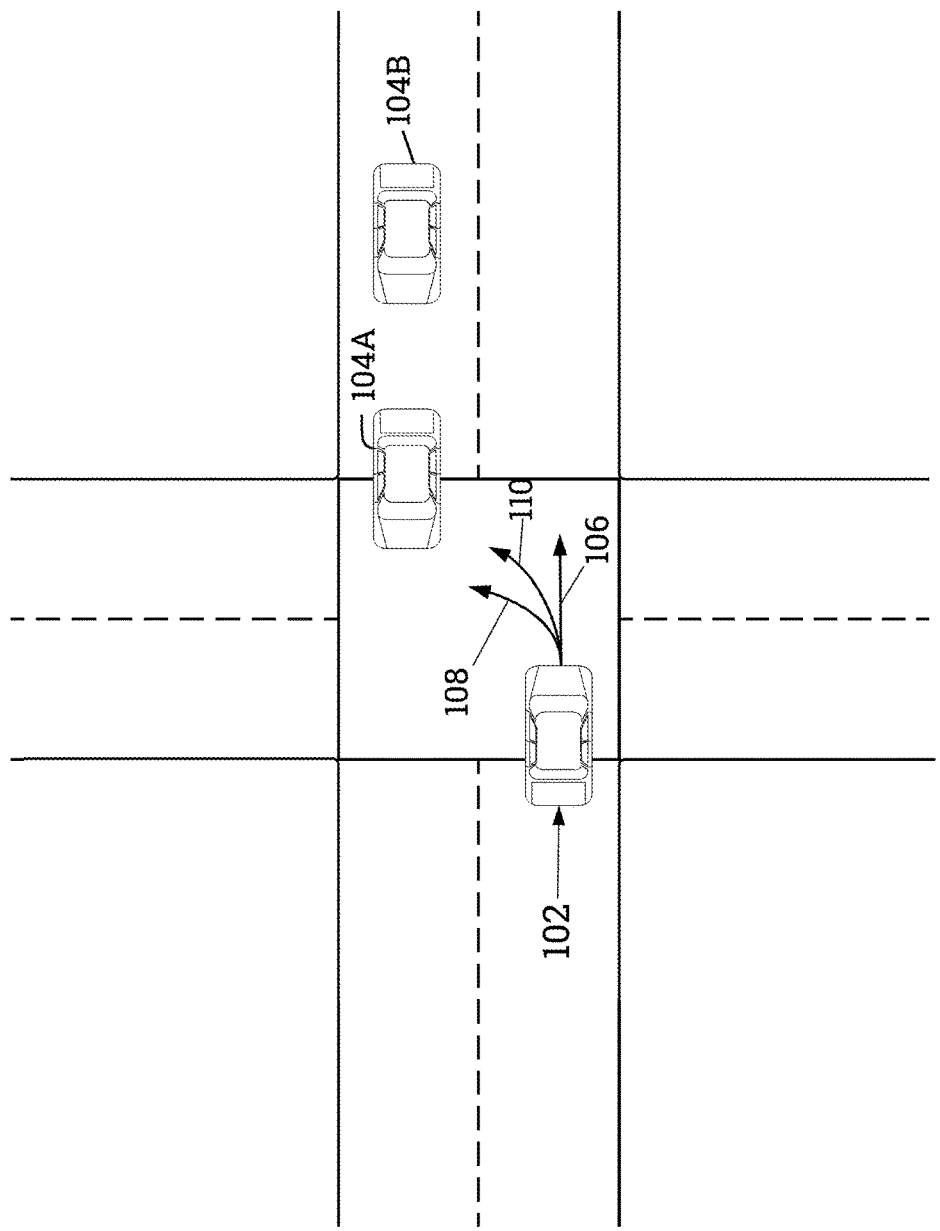
FIG. 1 illustrates an example of an autonomous vehicle (AV) performing an unprotected driving maneuver, according to some aspects of the disclosed technology.

FIG. 1 illustrates an example environment 100 in which an autonomous vehicle (AV) is performing an unprotected driving maneuver, according to some aspects of the disclosed technology. In the example illustrated in environment 100, an intersection is depicted in which an autonomous vehicle (AV) 102 is positioned to execute an unprotected (left-turn) driving maneuver. In the illustrated road configuration, the left-turn executed by AV 102 requires a traversal of a lane having oncoming traffic 104.

Before maneuvering (creeping) into the intersection AV 102 can be configured to determine/compute a wheel safety angle 110 that can represent an ideal wheel angle for AV 102. That is the wheel safety angle 110 can represent a wheel angle that is closest to turn angle 108, while also maintaining a close enough proximity to straight angle 106, which provides additional safety in the event of a collision. For example, if no collision were to occur, wheel safety angle 110 is close enough to turn angle 108 that sudden movements of AV can be minimized, while still safely executing a left turn maneuver. However, if a collision were to occur, wheel safety angle 110 would still help to ensure that AV 102 is not pushed into oncoming traffic 104, i.e., into the path of vehicles 104A and 104B.

In some aspects, AV 102 can also be configured to detect a likelihood of collision before impact, and to take additional safety measures. For example, as discussed in further detail below, if a collision is detected, AV 102 may engage a wheel locking device, such as an emergency break, to ensure that it is not pushed into oncoming traffic.

Figure 2:
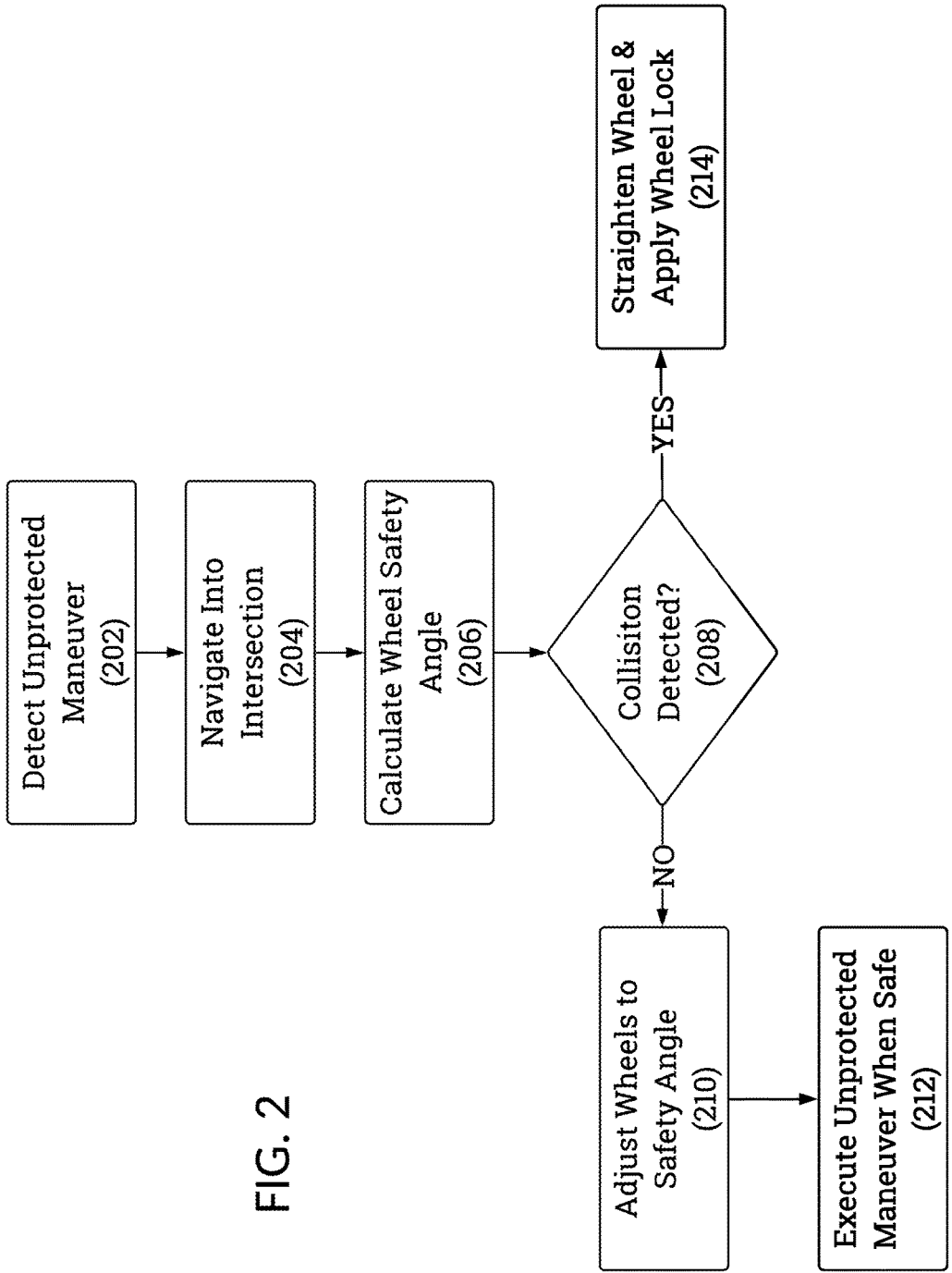
FIG. 2 illustrates an example of a decision process that can be used to implement an automatic wheel alignment process, according to some aspects of the disclosed technology.

FIG. 2 illustrates an example process 200 for implementing an automatic wheel alignment procedure, according to some aspects of the disclosed technology. Process 200 begins with block 202 in which an impending unprotected driving maneuver is detected, for example, by a navigation/planning system of an autonomous vehicle (AV). Detection of the unprotected maneuver can be based on routing and/or map data for the AV, for example, indicating where unprotected maneuvers are required. In other approaches, unprotected maneuvers may be detected based on data collected for the surrounding environment by one or more AV sensors, including cameras and/or Light Detection and Ranging (LiDAR) sensors. For example, sensor data may be used to identify unprotected intersections base on the arrangement of traffic lights and/or road signage, etc.

In block 204, the AV is navigated into the intersection. Navigation of the AV into the intersection can be performed in a stop-and-go manner, for example, due to potentially restricted visibility in the intersection. That is, the AV can be configured to "creep" into the intersection, at low speeds that are deemed to be safe for the current traffic and weather conditions.

In block 206, a wheel safety angle is computed, wherein the wheel safety angle represents an angle of wheel turn that optimally balances AV safety concerns and maneuver performance. In some approaches, the calculated wheel safety angle can depend on the intersection topology, such as the angle of roads conjoined at the intersection, and/or road/lane width, etc. In other approaches, the wheel safety angle may be computed based on an average between the turn angle and the straight angle. The wheel safety angle may also depend on traffic conditions. For example, where greater amounts of traffic are detected, the wheel safety angle may be closer to 180 degrees, i.e., where the wheels are pointed in a straight-forward direction relative to a heading of the AV. Alternatively, where less traffic is detected, the wheel safety angle may be closer to the actual turn angle needed to execute the unprotected (left-turn) maneuver.

In block 208, it is determined whether an impending collision is detected. In some aspects, collision likelihoods for one or more other vehicles (on the roadway) can be evaluated based on sensor data (e.g., camera/LiDAR data) collected from one or more AV sensors. By way of example, the likelihood of collision with any given vehicle may be determined based on the vehicle's speed, distance, and/or trajectory. In some aspects, determinations of collision likelihood can be based on a pre-determined threshold. For example, if the collision likelihood is determined to be above a pre-specified threshold, then the event may be registered as a likely impending collision. Alternatively, if the collision likelihood is determined to be below the pre-specified threshold, then the event may be ignored.

If no collision is detected, then process 200 proceeds to block 210, and the wheels of the AV are adjusted to the previously computed safety angle (block 206). Subsequently, when roadway conditions are deemed to be safe, the AV can execute the unprotected (left-turn) maneuver to continue course. However, if at block 208 an impending collision is detected, then additional safety precautions can be implemented accordingly. For example, process 200 can proceed to block 214 in which the wheel angle is adjusted in a manner likely to minimize damage, and wheel locks (e.g., emergency/safety brakes) can be applied. In some aspects, the wheel angle may be adjusted to a straight-angle, i.e., 180 degrees, and in alignment with the direction of the car, which can minimize the likelihood that the AV is pushed into traffic. It is understood that the wheel alignment angle can be adjusted to other angles, depending on a number of factors, including the speed, and direction of the predicted collision and/or the topography of the roadways and/or intersection, etc.

Figure 3:
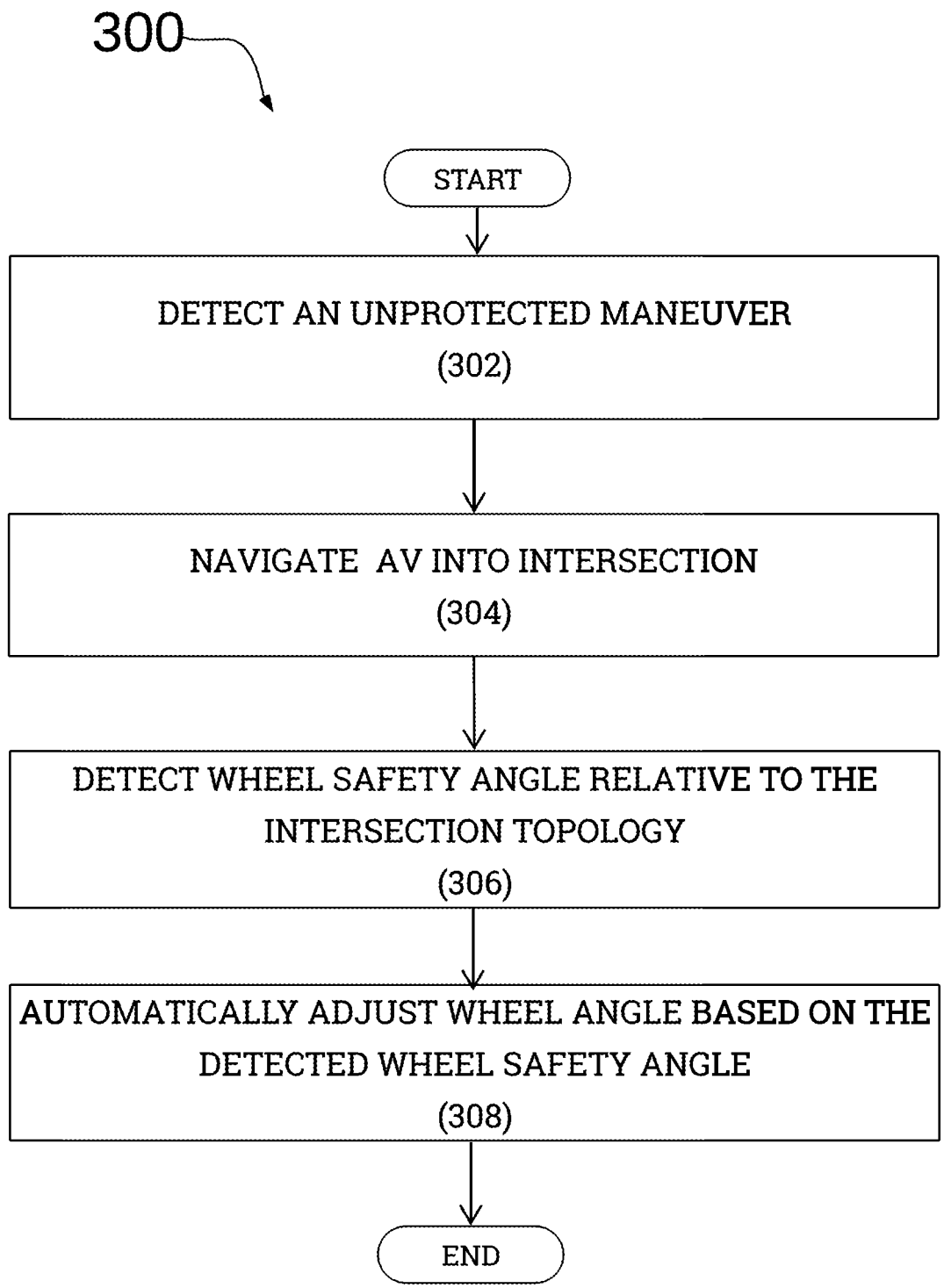
FIG. 3 illustrates steps of an example process for automatically adjusting wheel alignment of an AV, according to some aspects of the disclosed technology.

FIG. 3 illustrates steps of an example process 300 for automatically adjusting the wheel direction of an AV, according to some aspects of the disclosed technology. Process 300 begins with step 302 in which an unprotected maneuver is planned and/or detected. As discussed above, unprotected maneuvers can be identified based on environmental data collected by one or more AV sensors (LiDAR sensors and/or cameras), that is used to identify unprotected intersections.

In step 304, the AV navigates or creeps into the intersection, for example, in a position from which it is capable of executing an unprotected left-turn maneuver. Positioning of the AV can vary from intersection-to-intersection and can depend on traffic conditions and/or other conditions, such as weather conditions that may affect AV sensor visibility.

In step 306, a wheel safety angle is determined/detected. In some aspects, calculation of the wheel safety angle may occur before the AV is navigated into the intersection. By way of example, the wheel safety angle may be pre-determined and stored as a map-prior, for example, in a map database that is accessible by (or that resides on) the AV. In such implementations, the wheel safety angle may be based on wheel safety angle computations/determinations performed by one or more other AVs (e.g., in an AV fleet) that have previously navigated the same intersection. In other aspects, the wheel safety angle may be based on similarities between the intersection and one or more intersections store as map-priors in a map database. As such, wheel safety angle computations may benefit from previous computations performed by one or more other vehicles in the fleet, even in scenarios where the current intersection has no historic navigation data.

In step 308, the wheel angle is automatically adjusted based on the wheel safety angle. As discussed above, the wheel safety angle can represent a midpoint or average of the turn angle (i.e., the wheel angle needed to execute the left-turn), and the straight angle (i.e., the wheel angle that would be needed to keep the AV in the same lane). It is understood that the turn angle and straight angle can vary from intersection-to-intersection, and depend on the intersection topology.

Figure 4:
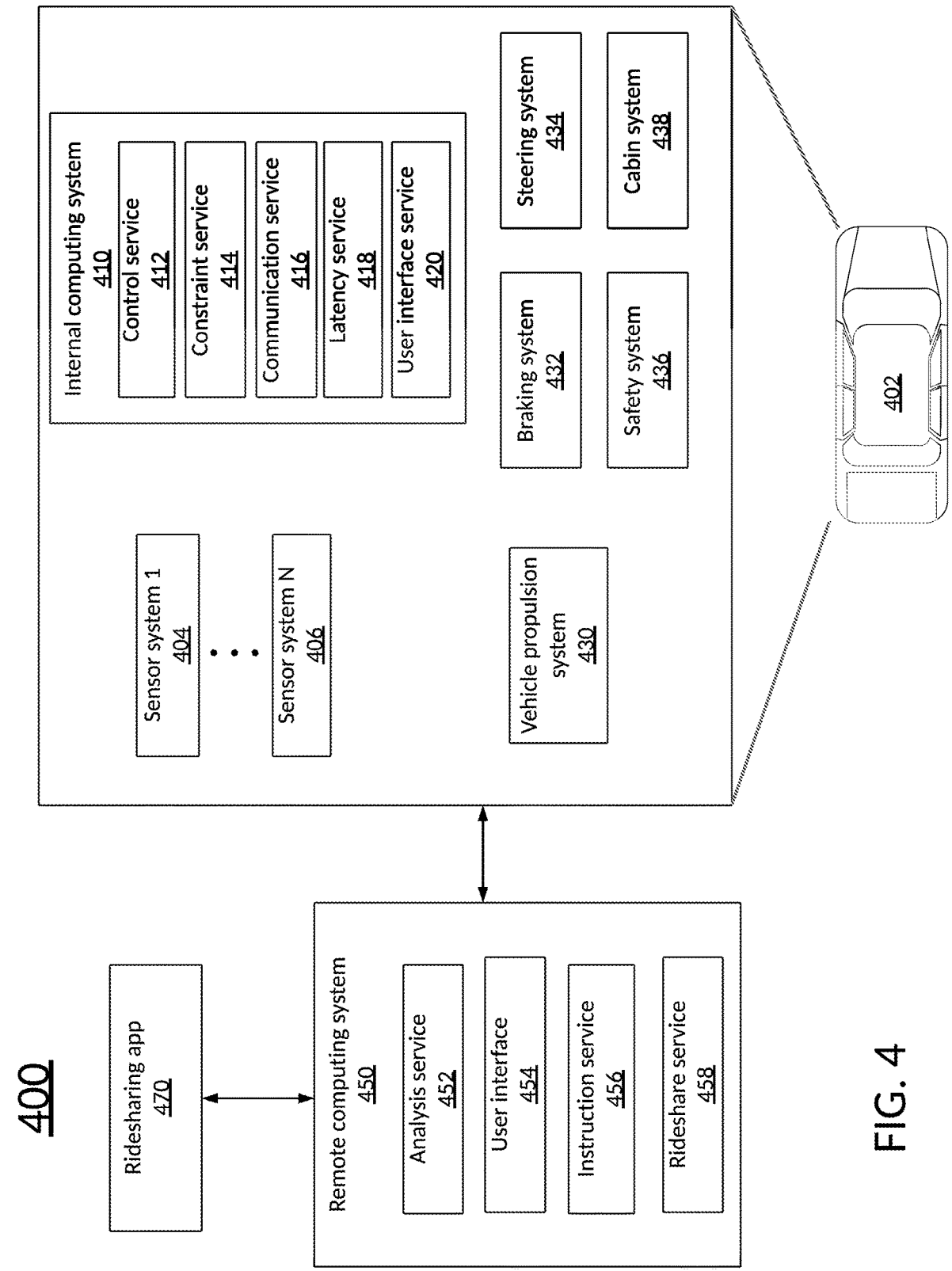
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. Autonomous vehicle 402 can navigate about roadways without a human driver based upon sensor signals output by sensor systems 404-406 of autonomous vehicle 402. Autonomous vehicle 402 includes a plurality of sensor systems 404-406 (a first sensor system 104 through an Nth sensor system 106). Sensor systems 404-406 are of different types and are arranged about the autonomous vehicle 402. For example, first sensor system 404 may be a camera sensor system and the Nth sensor system 406 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 480 are illustrated coupled to the autonomous vehicle 402, it is understood that more or fewer sensors may be coupled to the autonomous vehicle 402.

Autonomous vehicle 402 further includes several mechanical systems that are used to effectuate appropriate motion of the autonomous vehicle 402. For instance, the mechanical systems can include but are not limited to, vehicle propulsion system 430, braking system 432, and steering system 434. Vehicle propulsion system 430 may include an electric motor, an internal combustion engine, or both. The braking system 432 can include an engine brake, brake pads, actuators, and/or any other suitable componentry that is configured to assist in decelerating autonomous vehicle 402. In some cases, braking system 432 may charge a battery of the vehicle through regenerative braking. Steering system 434 includes suitable componentry that is configured to control the direction of movement of the autonomous vehicle 402 during navigation. Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with sensor systems 480 and systems 430, 432, 434, 436, and 438. Internal computing system 410 includes at least one processor and at least one memory having computer-executable instructions that are executed by the processor. The computer-executable instructions can make up one or more services responsible for controlling autonomous vehicle 402, communicating with remote computing system 450, receiving inputs from passengers or human co-pilots, logging metrics regarding data collected by sensor systems 480 and human co-pilots, etc.

Internal computing system 410 can include a control service 412 that is configured to control operation of vehicle propulsion system 430, braking system 208, steering system 434, safety system 436, and cabin system 438. Control service 412 receives sensor signals from sensor systems 480 as well communicates with other services of internal computing system 410 to effectuate operation of autonomous vehicle 402. In some embodiments, control service 412 may carry out operations in concert one or more other systems of autonomous vehicle 402. Internal computing system 410 can also include constraint service 414 to facilitate safe propulsion of autonomous vehicle 402. Constraint service 416 includes instructions for activating a constraint based on a rule-based restriction upon operation of autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 412.

The internal computing system 410 can also include communication service 416. The communication service 416 can include both software and hardware elements for transmitting and receiving signals from/to the remote computing system 450. Communication service 416 is configured to transmit information wirelessly over a network, for example, through an antenna array that provides personal cellular (long-term evolution (LTE), 3G, 4G, 5G, etc.) communication.

Internal computing system 410 can also include latency service 418. Latency service 418 can utilize timestamps on communications to and from remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, latency service 418 can enable other systems of autonomous vehicle 402 or a passenger to make necessary decisions or to provide the needed feedback.

Internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

Remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402. Remote computing system 450 can also include rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc. Remote computing system 450 can, in some cases, include at least one computing system 450 as illustrated in or discussed with respect to FIG. 5, or may include at least a subset of the components illustrated in FIG. 5 or discussed with respect to computing system 450.

Figure 5:
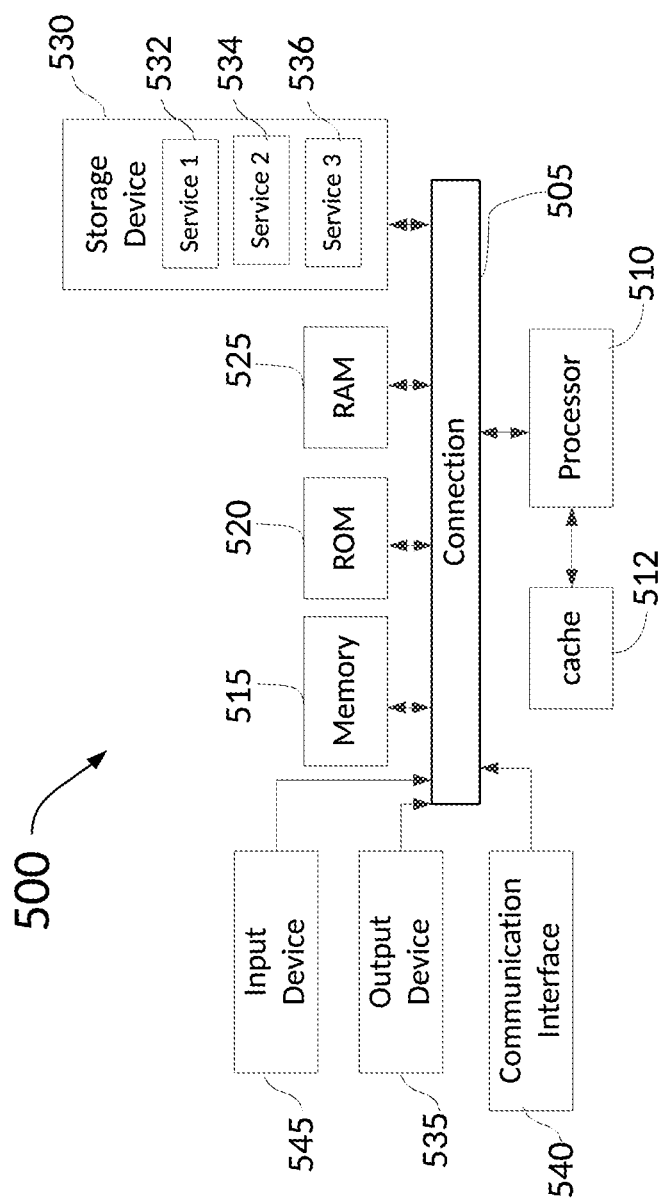
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 410, remote computing system 450, a passenger device executing the rideshare app 470, internal computing device 430, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for adjusting tire rotation of an autonomous vehicle (AV), the system comprising:
    an AV navigation and planning system comprising one or more processors; and
    a non-transitory computer-readable medium comprising instructions stored therein, which when executed by the one or more processors, cause the one or more processors to:
        detect by the AV navigation and planning system an unprotected intersection from data collected by one or more AV sensors of an environment surrounding the AV, wherein the AV navigation and planning system plans to perform an unprotected maneuver;
        determine, by the AV navigation and planning system, a first wheel safety angle that corresponds to a first wheel position in anticipation of the unprotected maneuver, wherein the first wheel safety angle is based on a topology of the unprotected intersection;
        determine, by the AV navigation and planning system, from data collected by the one or more AV sensors of the environment surrounding the AV, that a collision likelihood exceeds a predetermined threshold, the predetermined threshold indicating an impending collision with another vehicle based on a set of parameters collected by the one or more AV sensors;
        in response to the impending collision, determine a second wheel safety angle that corresponds to a second wheel position in anticipation of the impending collision, wherein the second wheel safety angle is configured to minimize damage to the AV due to the impending collision;
        determine a third wheel safety angle based on the first wheel safety angle and the second wheel safety angle and is between the first wheel safety angle and the second wheel safety angle; and
        adjust a wheel angle of the AV to the third wheel safety angle.

2. The system of claim 1, wherein the one or more processors are further configured to:
    lock one or more wheels of the AV based on the collision likelihood.

3. The system of claim 1, wherein the third wheel safety angle is further based on a traffic pattern associated with the unprotected intersection.

4. The system of claim 1, wherein the third wheel safety angle is further based on oncoming traffic with respect to the AV,
    wherein the third wheel safety angle is closer to the second wheel safety angle when the oncoming traffic is at a first level of traffic and the third wheel safety angle is closer to the first wheel safety angle when the oncoming traffic is at a second level of traffic, and
    wherein the first level of traffic is greater than the second level of traffic.

5. The system of claim 1, wherein the unprotected maneuver is an unprotected left-turn.

6. A computer-implemented method comprising:
    detecting, by a navigation and planning system of an autonomous vehicle (AV), an unprotected intersection from data collected by one or more AV sensors of an environment surrounding the AV, wherein the navigation and planning system plans to perform an unprotected maneuver;
    determining, by the navigation and planning system, a first wheel safety angle that corresponds to a first wheel position in anticipation of the unprotected maneuver, wherein the first wheel safety angle is based on a topology of the unprotected intersection;
    determining, by the navigation and planning system, from data collected by the one or more AV sensors of the environment surrounding the AV, that a collision likelihood exceeds a predetermined threshold, the predetermined threshold indicating an impending collision with another vehicle based on a set of parameters collected by the one or more AV sensors;
    in response to the impending collision, determining a second wheel safety angle that corresponds to a second wheel position in anticipation of the impending collision, wherein the second wheel safety angle is configured to minimize damage to the AV due to the impending collision;

determining a third wheel safety angle based on the first wheel safety angle and the second wheel safety angle and is between the first wheel safety angle and the second wheel safety angle; and adjusting a wheel angle of the AV to the third wheel safety angle.

7. The computer-implemented method of claim 6, further comprising:

locking one or more wheels of the AV based on the collision likelihood.

8. The computer-implemented method of claim 6, wherein the third wheel safety angle is further based on a traffic pattern associated with the unprotected intersection.

9. The computer-implemented method of claim 6, wherein the third wheel safety angle is further based on a traffic level with respect to the AV,
wherein the third wheel safety angle is closer to the second wheel safety angle when the traffic level is at a first level of traffic and the third wheel safety angle is closer to the first wheel safety angle when the traffic level is at a second level of traffic, and
wherein the first level of traffic is greater than the second level of traffic.

10. The computer-implemented method of claim 6, wherein the unprotected maneuver is an unprotected left-turn.

11. A non-transitory computer-readable storage medium comprising instructions stored therein, which when executed by one or more processors, cause the one or more processors to:

detecting, by a navigation and planning system of an autonomous vehicle (AV), an unprotected intersection from data collected by one or more AV sensors of an environment surrounding the AV, wherein the navigation and planning system plans to perform an unprotected maneuver;

determining, by the navigation and planning system, a first wheel safety angle that corresponds to a first wheel position in anticipation of the unprotected maneuver, wherein the first wheel safety angle is based on a topology of the unprotected intersection;

determining, by the navigation and planning system, from data collected by the one or more AV sensors of the environment surrounding the AV, that a collision likelihood exceeds a predetermined threshold, the predetermined threshold indicating an impending collision with another vehicle based on a set of parameters collected by the one or more AV sensors;

in response to the impending collision, determining a second wheel safety angle that corresponds to a second wheel position in anticipation of the impending collision, wherein the second wheel safety angle is configured to minimize damage to the AV due to the impending collision;

determining a third wheel safety angle based on the first wheel safety angle and the second wheel safety angle and is between the first wheel safety angle and the second wheel safety angle; and automatically adjusting a wheel angle of the AV to the third wheel safety angle.

12. The non-transitory computer-readable storage medium of claim 11, wherein the one or more processors are further configured to:

lock one or more wheels of the AV based on the collision likelihood.

13. The non-transitory computer-readable storage medium of claim 11, wherein the third wheel safety angle is further based on a traffic pattern associated with the unprotected intersection.

14. The non-transitory computer-readable storage medium of claim 11, wherein the third wheel safety angle is further based on oncoming traffic with respect to the AV,
wherein the third wheel safety angle is closer to the second wheel safety angle when the oncoming traffic is at a first level of traffic and the third wheel safety angle is closer to the first wheel safety angle when the oncoming traffic is at a second level of traffic, and
wherein the first level of traffic is greater than the second level of traffic.

15. The system of claim 1, wherein the second wheel safety angle corresponds to a straight angle that is aligned with the AV.

16. The system of claim 1, wherein the first wheel safety angle is based on wheel safety angle data obtained from a fleet of AVs that have navigated the unprotected intersection.

17. The system of claim 1, wherein the first wheel safety angle is stored in a map database accessible by the AV.

* * * * *